US010221689B1

(12) United States Patent
Ellerbusch

(10) Patent No.: US 10,221,689 B1
(45) Date of Patent: Mar. 5, 2019

(54) METHOD FOR FORMING AND MAINTAINING A FUNDAMENTALLY IMPERVIOUS BOUNDARY TO VERY HIGH PURITY HYDROGEN IN A SALT CAVERN

(71) Applicant: Air Liquide Large Industries U.S. LP, Houston, TX (US)

(72) Inventor: Susan A. Ellerbusch, Katy, TX (US)

(73) Assignee: Air Liquide Large Industries U.S. LP, Houston, TX (US)

(*) Notice: Subject to any disclaimer, the term of this patent is extended or adjusted under 35 U.S.C. 154(b) by 0 days.

(21) Appl. No.: 15/427,862

(22) Filed: Feb. 8, 2017

(51) Int. Cl.
  *B65G 5/00* (2006.01)
  *E21D 13/00* (2006.01)
  *E21F 17/16* (2006.01)
  *F17C 1/00* (2006.01)

(52) U.S. Cl.
  CPC ............ *E21D 13/00* (2013.01); *B65G 5/00* (2013.01); *E21F 17/16* (2013.01); *F17C 1/007* (2013.01); *F17C 2221/012* (2013.01)

(58) Field of Classification Search
  CPC . B65G 5/00; B65G 5/005; F17C 1/007; F17C 2221/012; F17C 2270/0152; Y02E 60/322; Y02E 60/321; E21D 13/00; E21F 17/16
  USPC .............................................. 405/53, 55, 58
  See application file for complete search history.

(56) References Cited

U.S. PATENT DOCUMENTS

| 2,009,534 A * | 7/1935 | Trump | E21B 43/28 299/5 |
| 4,342,911 A * | 8/1982 | French | G01V 5/08 250/257 |
| 8,690,476 B2 | 4/2014 | Oates | |
| 9,284,120 B2 | 3/2016 | Oates | |
| 9,322,253 B2 | 4/2016 | Barry et al. | |
| 2011/0305515 A1* | 12/2011 | Drnevich | B65G 5/00 405/53 |

(Continued)

FOREIGN PATENT DOCUMENTS

CN         203730538         7/2014

OTHER PUBLICATIONS

Maglienti, J., Schwartz, L., Weintraub, L., "Department of Environmental Convservation Staff Initial Post-Issues Conference Brief", Apr. 17, 2015 (Year: 2015).*

(Continued)

*Primary Examiner* — Carib A Oquendo
(74) *Attorney, Agent, or Firm* — Elwood L. Haynes

(57) ABSTRACT

A method for forming and maintaining a fundamentally impervious boundary to very high purity hydrogen stored in a salt cavern is provided. The cavern includes a salt cavern wall. The method includes introducing a compressed very high purity hydrogen gas into a salt cavern, thereby producing a stored very high purity hydrogen gas; forming a fundamentally impervious boundary to the very high purity hydrogen along at least a part of the perimeter of the salt cavern, and maintaining the fundamentally impervious boundary to the stored very high purity hydrogen gas at a pressure greater than 1.0 psi per linear foot of height within the cavern, and less than 4.0 psi per linear foot of height within the cavern and thereby retaining within the salt cavern over 95% of the stored very high purity hydrogen over a period of time of at least 72 hours.

1 Claim, 11 Drawing Sheets

(56) References Cited

U.S. PATENT DOCUMENTS

| | | | | |
|---|---|---|---|---|
| 2015/0321850 A1* | 11/2015 | Strybos | ............... | B65G 5/005 |
| | | | | 405/55 |
| 2015/0321859 A1* | 11/2015 | James | ............... | B65G 53/66 |
| | | | | 405/54 |
| 2016/0160644 A1* | 6/2016 | Strybos | ............... | E21D 13/00 |
| | | | | 405/58 |

OTHER PUBLICATIONS

Durup, J.G., "Long-term tests for tightness evaluations with brine and gas in salt: field test No. 2 with gas," Solution Mining Research Institute Research Project Report No. 94-00002-S, 1994, Hannover, Germany, 1-36.

Ghasemloonia, A. et al., "Feasibility study of underground salt caverns in Western Newfoundland: experimental and finite element investigation of creep-induced damage," Journal of Mining & Environment, vol. 6, No. 2, 2015, 205-224.

Kelsall, P.C. et al., "Geologic and engineering characteristics of Gulf Region salt domes applied to underground storage and mining," Sixth International Symposium on Salt, 11983, vol. 1, 519-544.

Robertson, E.G. et al., "Physical properties of salt, anhydrite, and gypsum—preliminary report," U.S. Department of the Interior Geological Survey, Trace Elements Memorandum Report 1048, Aug. 1958, 1-38.

* cited by examiner

US 10,221,689 B1

METHOD FOR FORMING AND MAINTAINING A FUNDAMENTALLY IMPERVIOUS BOUNDARY TO VERY HIGH PURITY HYDROGEN IN A SALT CAVERN

BACKGROUND

Very large volumes of gaseous hydrogen are commonly used in the chemical and petrochemical industries. Typically, these very high demands are met by providing gaseous hydrogen from a nearby hydrogen pipeline. There are serious financial risks for the supplier, and operational risks for the user, if the supply of gaseous hydrogen is interrupted. In such precarious conditions, it is beneficial to have a storage facility connected to the pipeline to buffer such potential disruptions. If such an interruption is due to an unscheduled hydrogen production plant outage, this disturbance may take many hours or days to remedy. Hence the storage facility will need to be very large to be useful, One alternative, if it is geologically convenient, is an underground salt cavern.

However, it is reported in the literature that high purity (e.g., 99.99%) hydrogen storage within salt caverns presents several challenges, (See U.S. Pat. Nos. 8,690,476 and 9,284,120, the entire contents of which are both hereby incorporated by reference.) This literature states that, for example, storing large quantities (e.g., greater than 100 million standard cubic feet) of pure (e.g., 99.99%) gaseous hydrogen in underground salt caverns consisting of a minimum salt purity of 75% halite (NaCl) or greater without measurable losses is difficult based on the properties of hydrogen. It is noted in this literature that hydrogen is the smallest and lightest element within the periodic table of elements, having an atomic radius measuring 25 pm+/−5 pm.

Further, hydrogen is flammable, and therefore a very dangerous chemical if not handled properly. The literature states that salt caverns consist of salt that have various ranges of permeability (e.g., 0-23×10^-6 Darcy) that if not controlled properly could easily allow gaseous hydrogen to permeate through the salt and escape to the surface of the formation. If the stored hydrogen within an underground salt formation was to escape and permeate through the salt formation to the surface, a dangerous situation could arise with fatality potential or immense structural damage potential. The literature also observes that high purity hydrogen is typically considered one of the most difficult elements to contain within underground salt formations. (See U.S. Pat. No. 8,690,476)

While the in-situ salt formation within a salt cavern may be essentially gas impermeable, the process of solution mining the salt and forming the cavern, even though continuously filled with pressurized fluid, is known to introduce fractures of various sizes in the crystal structure of the salt. While the salt naturally has low permeability and porosity rendering it largely impermeable to hydrocarbons, it is reported in the literature that the salt is significantly more prone to very high purity hydrogen permeation by virtue of hydrogen's small atomic radius. (See U.S. Pat. No. 8,690,476, column 1, lines 56-64)

This same prior art has reported that pressures in excess of 1.0 psi per linear foot within salt caverns ($H_{cavern}$) is the technological pressure limit for the state of the art for substantially confining hydrogen when storing very high purity hydrogen rather than other products with larger molecular sizes such as natural gas. See, for example, U.S. Pat. No. 8,690,476, which references instant FIG. 10 (Prior Art FIG. 4C), wherein it states:

"FIG. 4C, on the other hand, is indicative of one or more cracks or fractures along the salt walls 203 which can potentially form when the stored hydrogen 4 is maintained in the cavern 3 at a pressure substantially greater than about 1 psi per foot of cavern depth. The cracks are sufficiently large to allow hydrogen to leak therethrough. By way of comparison, the hydrogen leakage across the salt walls 203 occurs at a higher flow rate than the hydrogen seepage in FIG. 4A by virtue of the cracks creating larger flow paths. The scenario of FIG. 4C is representative of the stored hydrogen 4 being stored above the upper limit."

U.S. Pat. No. 8,690,476 defines the term "cavern depth" with reference to instant FIG. 11 (Prior Art FIG. 2), as follows:

"The cavern depth that starts at the top of the salt and ends at the bottom of the salt cavity is denoted as "d" and is defined as the vertical distance spanning from the top-most portion 204 to the bottom-most portion 207 of the salt cavern 3."

For a given salt cavern volume, an increase in the maximum allowable gas storage pressure will result in the ability to store a greater number of gas molecules. If one doubles the storage pressure, the number of standard cubic feet of gas that can be stored in the same volume is essentially doubled. If one triples the storage pressure, the number of standard cubic feet that can be stored in the same volume is essentially tripled. The factor that keeps this from being a direct ratio is the compressibility factor, which for hydrogen increases by about 7% when tripled, at the pressures at which the gas is typically stored. Salt cavern mining and construction is quite expensive. Therefore, there is significant financial and commercial advantage for finding a safe and economical method for increasing the storage capacity of very high purity hydrogen gas per unit of physical volume in an existing underground salt cavern or when constructing a new salt cavern storage facility.

The inventors have found that, under appropriate conditions, the current technological limit of "1 psi per foot of cavern depth" as defined above in the literature may be significantly exceeded resulting in greatly improved economics for hydrogen salt cavern storage.

SUMMARY

The Invention may be further defined in part by the following numbered sentences:

Sentence 1, A method for forming and maintaining a fundamentally impervious boundary to very high purity hydrogen stored in a salt cavern, comprising a salt cavern wall, the method comprising; introducing a compressed very high purity hydrogen gas into a salt cavern, thereby producing a stored very high purity hydrogen gas; forming a fundamentally impervious boundary to the very high purity hydrogen along at least a part of the perimeter of the salt cavern, maintaining the fundamentally impervious boundary to the stored very high purity hydrogen gas at a pressure greater than 1.0 psi per linear foot of height within the cavern, and less than 4.0 psi per linear foot of height within the cavern and thereby retaining within the salt cavern over 95% of the stored very high purity hydrogen over a period of time of at least 72 hours.

Sentence 2, the method of sentence 1, wherein the salt cavern comprises a stable roof formed by a method of solution mining under an inert blanket, comprising: a) providing a solution mined underground salt cavern, wherein said salt cavern has a main body with a mean diameter of $D_N$, and an upper portion comprising an inert gas pad, b) providing a stream of leaching water which is injected below the inert gas pad with a velocity V, thereby leaching an Nth tier adjacent to the upper portion having a height H1 and a mean diameter $D_{N+1}$ that is smaller than $D_N$ by a predetermined ratio $R_1$, c) raising the inert gas pad by a predetermined amount A1, d) providing a stream of leaching water which is injected below the inert gas pad with a velocity V, thereby leaching a N+1th tier adjacent to the Nth tier having a height H2 and a to a mean diameter $D_{N+2}$ that is smaller than $D_{N+1}$ by a predetermined ratio $R_2$, e) repeating steps c and d a predetermined number of times T, thereby forming a stable roof.

Sentence 3, the method of sentence 2, wherein the inert gas is selected from the group consisting of nitrogen, helium, argon, methane, and combinations thereof.

Sentence 4, the method of sentence 2, wherein H2 is between 10 and 50 feet.

Sentence 5, the method of sentence 2, wherein $R_1$ and/or $R_2$ is between 15% and 35%.

Sentence 6, the method of sentence 2, wherein V is between 5 feet per second and 9 feet per second.

Sentence 7, the method of sentence 1, wherein the salt cavern comprises a domed stable roof formed by a method of solution mining under an inert blanket, comprising: a) providing a solution mined underground salt cavern, wherein said salt cavern has a main body with a mean diameter of $D_N$, and an upper portion comprising an inert gas pad, b) providing a stream of leaching water which is injected below the inert gas pad with a velocity V, thereby leaching an Nth tier adjacent to the upper portion having a height H1 and a mean diameter $D_{N+1}$ that is smaller than $D_N$ by a predetermined ratio $R_1$, c) raising the inert gas pad by a predetermined amount A1, d) providing a stream of leaching water which is injected below the inert gas pad with a velocity V, thereby leaching a N+1th tier adjacent to the Nth tier having a height H2 and a to a mean diameter $D_{N+2}$ that is smaller than $D_{N+1}$ by a predetermined ratio $R_2$, e) repeating steps c and d a predetermined number of times T, thereby forming a stable roof.

Sentence 8, the method of sentence 7, wherein H2 is between 10 and 50 feet.

Sentence 9, the method of sentence 7, wherein $R_1$ and/or $R_2$ is between 15% and 35%.

Sentence 10, the method of sentence 1, wherein the salt cavern comprises a domed roof formed by a process comprising the steps of: a) providing a solution mined underground salt cavern, wherein said salt cavern has a main body with a mean diameter of $D_N$, and an upper portion comprising an inert gas pad, b) providing a stream of leaching water which is injected below the inert gas pad with a velocity V, thereby leaching an Nth tier adjacent to the upper portion having a height H1 and a mean diameter $D_{N+1}$ that is smaller than $D_N$ by a predetermined ratio $R_1$, c) raising the inert gas pad by a predetermined amount A1, d) providing a stream of leaching water which is injected below the inert gas pad with a velocity V, thereby leaching a N+1th tier adjacent to the Nth tier having a height H2 and a to a mean diameter $D_{N+2}$ that is smaller than $D_{N+1}$ by a predetermined ratio $R_2$, e) repeating steps c and d a predetermined number of times T, thereby forming a stable roof.

Sentence 11, the method of sentence 10, wherein H2 is between 10 and 50 feet.

Sentence 12, the method of sentence 10, wherein $R_1$ and/or $R_2$ is between 15% and 35%.

Sentence 13, the method of sentence 1, wherein the cavern comprises an aspect ratio between 3:1 and 7:1.

Sentence 14, the method of sentence 1, wherein the cavern comprises an aspect ratio between 3.25:1 and 6.75:1.

Sentence 15, the method of sentence 1, wherein the cavern comprises an aspect ratio between 3.5:1 and 6.5:1.

Sentence 16, the method of sentence 1, wherein the cavern comprises an aspect ratio between 3.75:1 and 6.25:1.

Sentence 17, the method of sentence 1, wherein the cavern comprises an aspect ratio between 4:1 and 6:1.

Sentence 18, the method of sentence 1, wherein the salt cavern wall comprises salt having a mean creep constant along substantially the entire cavern wall of less than $1.5 \times 10^{-30}$ $1/(psf^n \cdot sec)$.

Sentence 19, the method of sentence 1, wherein the salt cavern wall comprises salt having a mean creep constant along substantially the entire cavern wall of less than $5.0 \times 10^{-30}$ $1/(psf^n \cdot sec)$.

Sentence 20, the method of sentence 1, wherein the salt cavern wall comprises salt having a mean creep constant along substantially the entire cavern wall of less than $7.5 \times 10^{-30}$ $1/(psf^n \cdot sec)$.

Sentence 21, the method of sentence 1, wherein the salt cavern wall comprises salt having a mean creep constant along substantially the entire cavern wall of less than $1.0 \times 10^{-29}$ $1/(psf^n \cdot sec)$.

Sentence 22, the method of sentence 1, wherein the salt cavern wall comprises salt having a mean creep constant along substantially the entire cavern wall of less than $1.5 \times 10^{-29}$ $1/(psf^n \cdot sec)$.

Sentence 23, the method of sentence 1, wherein the salt cavern wall comprises salt having a mean tensile strength along substantially the entire cavern wall of less than 200 psi.

Sentence 24, the method of sentence 1, wherein the salt cavern wall comprises salt having a mean tensile strength along substantially the entire cavern wall of less than 190 psi.

Sentence 25, the method of sentence 1, wherein the salt cavern wall comprises salt having a mean tensile strength along substantially the entire cavern wall of less than 180 psi.

Sentence 26, the method of sentence 1, wherein the salt cavern wall comprises salt having a mean tensile strength along substantially the entire cavern wall of less than 175 psi.

Sentence 27, the method of sentence 1, wherein the salt cavern wall comprises salt having a mean tensile strength along substantially the entire cavern wall of less than 170 psi.

Sentence 28, the method of sentence 1, wherein the salt cavern wall comprises salt having a mean compressive strength along substantially the entire cavern wall of less than 2700 psi.

Sentence 29, the method of sentence 1, wherein the salt cavern wall comprises salt having a mean compressive strength along substantially the entire cavern wall of less than 2600 psi.

Sentence 30, the method of sentence 1, wherein the salt cavern wall comprises salt having a mean compressive strength along substantially the entire cavern wall of less than 2500 psi.

Sentence 31, the method of sentence 1, wherein the salt cavern wall comprises salt having a mean compressive strength along substantially the entire cavern wall of less than 2400 psi.

Sentence 32, the method of sentence 1, wherein the salt cavern wall comprises salt having a mean compressive strength along substantially the entire cavern wall of less than 2300 psi.

Sentence 33, the method of sentence 1, wherein the salt cavern wall comprises salt with a mean Young's Modulus along substantially the entire cavern wall of more than 4,000,000 psi.

Sentence 34, the method of sentence 1, wherein the salt cavern wall comprises salt with a mean Young's Modulus along substantially the entire cavern wall of more than 4,200,000 psi.

Sentence 35, the method of sentence 1, wherein the salt cavern wall comprises salt with a mean Young's Modulus along substantially the entire cavern wall of more than 4,300,000 psi.

Sentence 36, the method of sentence 1, wherein the salt cavern wall comprises salt with a mean Young's Modulus along substantially the entire cavern wall of more than 4,400,000 psi.

Sentence 37, the method of sentence 1, wherein the salt cavern wall comprises salt with a mean Young's Modulus along substantially the entire cavern wall of more than 4,500,000 psi.

In another embodiment, the Invention may be further defined in part by the following numbered sentences: Sentence 1. a method for forming and maintaining a fundamentally impervious boundary in a salt cavern, comprising: introducing a compressed very high purity hydrogen gas into a salt cavern, thereby producing a stored very high purity hydrogen gas; forming a fundamentally impervious boundary at least along a portion of the walls of the cavern, wherein the porosity of the walls of the salt cavern is partially reduced to a size substantially small so as to prevent substantially all of the stored very high purity hydrogen from passing therethrough, and maintaining the stored very high purity hydrogen gas at a pressure greater than 1.0 psi per linear foot of height within the cavern, and less than 4.0 psi per linear foot of height within the cavern.

Sentence 2, the method of sentence 1, wherein the salt cavern comprises a stable roof formed by a method of solution mining under an inert blanket, comprising: a) providing a solution mined underground salt cavern, wherein said salt cavern has a main body with a mean diameter of $D_N$, and an upper portion comprising an inert gas pad, b) providing a stream of leaching water which is injected below the inert gas pad with a velocity V, thereby leaching an Nth tier adjacent to the upper portion having a height H1 and a mean diameter $D_{N+1}$ that is smaller than $D_N$ by a predetermined ratio $R_1$, c) raising the inert gas pad by a predetermined amount A1, d) providing a stream of leaching water which is injected below the inert gas pad with a velocity V, thereby leaching a N+1th tier adjacent to the Nth tier having a height H2 and a to a mean diameter $D_{N+2}$ that is smaller than $D_{N+1}$ by a predetermined ratio $R_2$, e) repeating steps c and d a predetermined number of times T, thereby forming a stable roof.

Sentence 3, the method of sentence 2, wherein the inert gas is selected from the group consisting of nitrogen, helium, argon, methane, and combinations thereof.

Sentence 4, the method of sentence 2, wherein H2 is between 10 and 50 feet.

Sentence 5, the method of sentence 2, wherein $R_1$ and/or $R_2$ is between 15% and 35%.

Sentence 6, the method of sentence 2, wherein V is between 5 feet per second and 9 feet per second.

Sentence 7, the method of sentence 1, wherein the salt cavern comprises a domed stable roof formed by a method of solution mining under an inert blanket, comprising: a) providing a solution mined underground salt cavern, wherein said salt cavern has a main body with a mean diameter of $D_N$, and an upper portion comprising an inert gas pad, b) providing a stream of leaching water which is injected below the inert gas pad with a velocity V, thereby leaching an Nth tier adjacent to the upper portion having a height H1 and a mean diameter $D_{N+1}$ that is smaller than $D_N$ by a predetermined ratio $R_1$, c) raising the inert gas pad by a predetermined amount A1, d) providing a stream of leaching water which is injected below the inert gas pad with a velocity V, thereby leaching a N+1th tier adjacent to the Nth tier having a height H2 and a to a mean diameter $D_{N+2}$ that is smaller than $D_{N+1}$ by a predetermined ratio $R_2$, e) repeating steps c and d a predetermined number of times T, thereby forming a stable roof.

Sentence 8, the method of sentence 7, wherein H2 is between 10 and 50 feet.

Sentence 9, the method of sentence 7, wherein $R_1$ and/or $R_2$ is between 15% and 35%.

Sentence 10, the method of sentence 1, wherein the salt cavern comprises a domed roof formed by a process comprising the steps of: a) providing a solution mined underground salt cavern, wherein said salt cavern has a main body with a mean diameter of $D_N$, and an upper portion comprising an inert gas pad, b) providing a stream of leaching water which is injected below the inert gas pad with a velocity V, thereby leaching an Nth tier adjacent to the upper portion having a height H1 and a mean diameter $D_{N+1}$ that is smaller than $D_N$ by a predetermined ratio $R_1$, c) raising the inert gas pad by a predetermined amount A1, d) providing a stream of leaching water which is injected below the inert gas pad with a velocity V, thereby leaching a N+1th tier adjacent to the Nth tier having a height H2 and a to a mean diameter $D_{N+2}$ that is smaller than $D_{N+1}$ by a predetermined ratio $R_2$, e) repeating steps c and d a predetermined number of times T, thereby forming a stable roof.

Sentence 11, the method of sentence 10, wherein H2 is between 10 and 50 feet.

Sentence 12, the method of sentence 10, wherein $R_1$ and/or $R_2$ is between 15% and 35%.

Sentence 13, the method of sentence 1, wherein the cavern comprises an aspect ratio between 3:1 and 7:1.

Sentence 14, the method of sentence 1, wherein the cavern comprises an aspect ratio between 3.25:1 and 6.75:1.

Sentence 15, the method of sentence 1, wherein the cavern comprises an aspect ratio between 3.5:1 and 6.5:1.

Sentence 16, the method of sentence 1, wherein the cavern comprises an aspect ratio between 3.75:1 and 6.25:1.

Sentence 17, the method of sentence 1, wherein the cavern comprises an aspect ratio between 4:1 and 6:1.

Sentence 18, the method of sentence 1, wherein the salt cavern wall comprises salt having a mean creep constant along substantially the entire cavern wall of less than $1.5 \times 10^{-30}$ $1/(psf^n \cdot sec)$.

Sentence 19, the method of sentence 1, wherein the salt cavern wall comprises salt having a mean creep constant along substantially the entire cavern wall of less than $5.0 \times 10^{-30}$ $1/(psf^n \cdot sec)$.

Sentence 20, the method of sentence 1, wherein the salt cavern wall comprises salt having a mean creep constant along substantially the entire cavern wall of less than $7.5 \times 10^{-30}$ $1/(psf^n \cdot sec)$.

Sentence 21, the method of sentence 1, wherein the salt cavern wall comprises salt having a mean creep constant along substantially the entire cavern wall of less than $1.0 \times 10^{-29}$ $1/(psf'' \cdot sec)$.

Sentence 22, the method of sentence 1, wherein the salt cavern wall comprises salt having a mean creep constant along substantially the entire cavern wall of less than $1.5 \times 10^{-29}$ $1/(psf'' \cdot sec)$.

Sentence 23, the method of sentence 1, wherein the salt cavern wall comprises salt having a mean tensile strength along substantially the entire cavern wall of less than 200 psi.

Sentence 24, the method of sentence 1, wherein the salt cavern wall comprises salt having a mean tensile strength along substantially the entire cavern wall of less than 190 psi.

Sentence 25, the method of sentence 1, wherein the salt cavern wall comprises salt having a mean tensile strength along substantially the entire cavern wall of less than 180 psi.

Sentence 26, the method of sentence 1, wherein the salt cavern wall comprises salt having a mean tensile strength along substantially the entire cavern wall of less than 175 psi.

Sentence 27, the method of sentence 1, wherein the salt cavern wall comprises salt having a mean tensile strength along substantially the entire cavern wall of less than 170 psi.

Sentence 28, the method of sentence 1, wherein the salt cavern wall comprises salt having a mean compressive strength along substantially the entire cavern wall of less than 2700 psi.

Sentence 29, the method of sentence 1, wherein the salt cavern wall comprises salt having a mean compressive strength along substantially the entire cavern wall of less than 2600 psi.

Sentence 30, the method of sentence 1, wherein the salt cavern wall comprises salt having a mean compressive strength along substantially the entire cavern wall of less than 2500 psi.

Sentence 31, the method of sentence 1, wherein the salt cavern wall comprises salt having a mean compressive strength along substantially the entire cavern wall of less than 2400 psi.

Sentence 32, the method of sentence 1, wherein the salt cavern wall comprises salt having a mean compressive strength along substantially the entire cavern wall of less than 2300 psi.

Sentence 33, the method of sentence 1, wherein the salt cavern wall comprises salt with a mean Young's Modulus along substantially the entire cavern wall of more than 4,000,000 psi.

Sentence 34, the method of sentence 1, wherein the salt cavern wall comprises salt with a mean Young's Modulus along substantially the entire cavern wall of more than 4,200,000 psi.

Sentence 35, the method of sentence 1, wherein the salt cavern wall comprises salt with a mean Young's Modulus along substantially the entire cavern wall of more than 4,300,000 psi.

Sentence 36, the method of sentence 1, wherein the salt cavern wall comprises salt with a mean Young's Modulus along substantially the entire cavern wall of more than 4,400,000 psi.

Sentence 37, the method of sentence 1, wherein the salt cavern wall comprises salt with a mean Young's Modulus along substantially the entire cavern wall of more than 4,500,000 psi.

DESCRIPTION OF EMBODIMENTS

Figure 1:
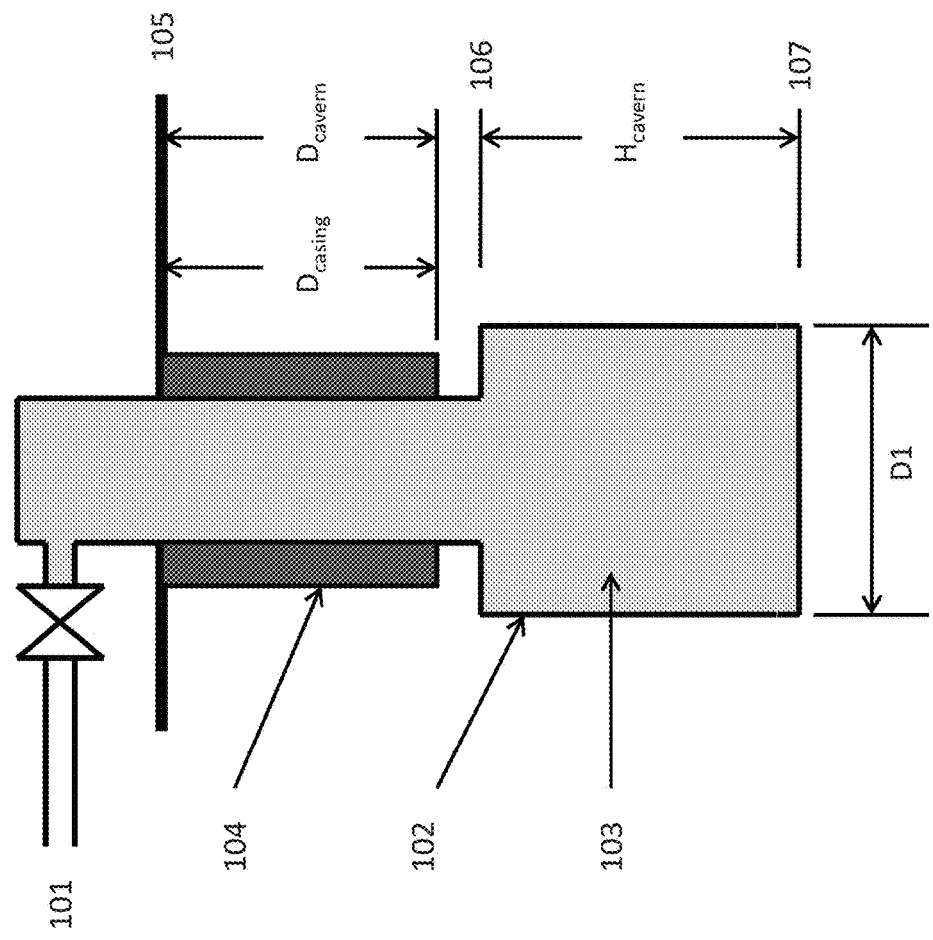
FIG. 1 is a schematic representation of a salt cavern, in accordance with one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure In a manner that will be discussed, a fundamentally impervious boundary along the interior of the salt cavern can be formed or maintained for storing hydrogen product. The ability to store hydrogen product within such a salt cavern having a fundamentally impervious boundary can advantageously produce a nearly completely gas-tight salt cavern not prone to leakage of stored very high purity hydrogen product through the salt cavern walls, as is reported in the literature to commonly occur with typical salt caverns. (See U.S. Pat. No. 8,690,476)

The inventors have found that, under appropriate conditions, the limit of "1 psi per foot of cavern depth" as defined above in the literature for substantially containing very high purity hydrogen may indeed be significantly exceeded.

Herein, a method is provided for storing very high purity hydrogen in a salt cavern, wherein the stored very high purity hydrogen gas is pressurized to in excess of and maintained at a pressure greater than 1.0 psi per linear foot of height within the cavern, possibly up to as much as 4.0 psi per linear foot of height within the cavern ($H_{cavern}$). Preferably, the very high purity hydrogen would be maintained at a pressure greater than 1.1 psi per linear foot of height within the cavern, and less than or equal to 3.0 psi per liner foot within the cavern. By extending this upper limit, the present invention improves the prior art by allowing greater commercial exploitation of the same amount of physical cavern volume.

As used herein, the term "maintain" is defined as to keep the cavern pressure between the upper desired pressure and the lower desired pressure, within the accuracy of the control system. Herein this system accuracy is presumed to be +/-2%, preferably +/-1%, more preferably +/-0.5%. Given the nature of the cavern usage, the pressure will vary based on very high purity hydrogen usage and replacement. It is understood that due to unanticipated supply or demand conditions, there may be transient periods of pressure that may place the pressure temporarily outside the desired upper or lower pressures. It is presumed that the duration of these transient periods will be less than 24 hours, preferably less than 12 hours, and more preferably less than 6 hours in duration. "Maintaining" specifically includes a sustained very high purity hydrogen pressure within a salt cavern above the 1.0 psi per foot of height within the salt cavern. The very high purity hydrogen pressure may in some implementations be Maintained above the 1.0 psi per foot of height within the salt cavern for at least 6 hrs, at least 12 hours, at least 24 hours, at least 72 hours; up to 1 week, 2 weeks, 1 month, two months, or even longer (i.e. indefinitely).

The inventors propose a method for storing very high purity hydrogen in a salt cavern, comprising introducing a compressed very high purity hydrogen gas into a salt cavern, thereby producing a stored very high purity hydrogen gas; maintaining the stored very high purity hydrogen gas at a pressure greater than 1.0 psi per linear foot of height within the cavern ($H_{cavern}$), and a pressure less than 4.0 psi per linear foot of height within the cavern, whereby the salt cavern forms and/or maintains a fundamentally impervious boundary to substantially contain the stored very high purity hydrogen therein between pressure greater than 1.0 psi per linear foot of height in the cavern and a pressure less than 4.0 psi per linear foot of height within the cavern.

The inventors propose a method for forming and maintaining a fundamentally impervious boundary in a salt cavern, comprising introducing a compressed very high purity hydrogen gas into a salt cavern, thereby producing a stored very high purity hydrogen gas; forming a fundamentally impervious boundary at least along a portion of the walls of the cavern, wherein the porosity of the walls of the salt cavern is partially reduced to a size substantially small so as to prevent substantially all of the stored hydrogen from passing therethrough, and maintaining the stored very high purity hydrogen gas at a pressure greater than 1.0 psi per linear foot of height within the cavern, and less than 4.0 psi per linear foot of height within the cavern.

It should be recognized that regardless of the calculation of a maximum safe, and commercially attractive, cavern pressure limit that may be determined from the height within the salt cavern, there are state mandated maximum allowable pressure limits that are typically defined differently. The state mandated maximum pressure limits based on lithostatic pressure are defined as a function of the depth of the salt cavern from the surface (as defined below). This limit, typically approximately 0.85 psi per foot of depth of the cavern from the surface, may not be exceeded by law, regardless of what might otherwise be feasible.

The term "substantially the entire cavern wall", as used herein, is defined as more than 75% of the entire cavern interior wall, preferably more than 85% of the entire cavern interior wall, more preferably more than 95% of the entire cavern interior wall.

The "height within the salt cavern", $H_{cavern}$, as used herein, is defined as the distance from the upper most portion of the cavern (for example 106) to the lower most portion of the cavern (for example 107).

The "depth of the salt cavern", $D_{cavern}$, as used herein, is defined as the distance from grade (for example 105) to the final cemented casing shoe $D_{casing}$.

The term "fundamentally impervious boundary" as used herein refers to the layer of salt in the walls of the salt cavern that when formed or maintained, restricts the flow of very high purity hydrogen. As used herein, a "fundamentally impervious boundary" retains over 95% of the stored very high purity hydrogen over a period of time of at least 72 hours, preferable 99% or more, such as 99.5% or more, or 99.9% or more.

The term "very high purity hydrogen" as used herein is defined as having a hydrogen content of greater than 95%, preferably greater than or equal to 97%, and more preferably greater than or equal to 99% such as 99.9% hydrogen. Preferably "very high purity hydrogen" is the sole gas that is being intentionally introduced into the cavern for storage. Preferably, the cavern sill have no residual gases from prior storage uses and/or be a newly mined salt cavern with no prior storage use(s).

The term "creep constant" as used herein is defined by the following equation:

$$\log \acute{\varepsilon}_s = \log A + n \log(\Delta\sigma)$$

where:
$\acute{\varepsilon}_s$=the steady-state creep strain rate
A=the creep constant
n=the stress exponent, and
$\Delta\sigma$=the imposed stress difference The term "aspect ratio" as used herein is defined as the ratio of the height within the salt cavern divided by the mean width of the cavern. In this document, the term "high aspect ratio" is used to describe a cavern that is relatively long with respect to the diameter. In this document, the term "low aspect ratio" is used to describe a cavern that is relatively short with respect to the diameter. In this document, an aspect ratio of greater than 7:1, preferably 8:1, more preferably 9:1, is considered a "high aspect ratio". In this document an aspect ratio of less than 7:1, preferably 6:1, more preferably 5:1 is considered a "low aspect ratio".

Turning to FIG. 1, compressed very high purity hydrogen 103 is stored in underground salt cavern 102. The salt cavern 102 will generally have a conduit 101 for admitting or removing the compressed very high purity hydrogen 103. As the underground storage volume may be at a considerable depth below grade 105, the nominally vertical portions of conduit 101 may be anchored into the surrounding rock formations by means of a cemented casing 104. The depth of the casing from grade 105 to the limit of the cemented casing 104 is the depth of the casing $D_{casing}$. In this example, the height within the salt cavern $H_{cavern}$ is defined as the distance from the upper most portion of the cavern 106 to the lower most portion of the cavern 107.

Figure 2:
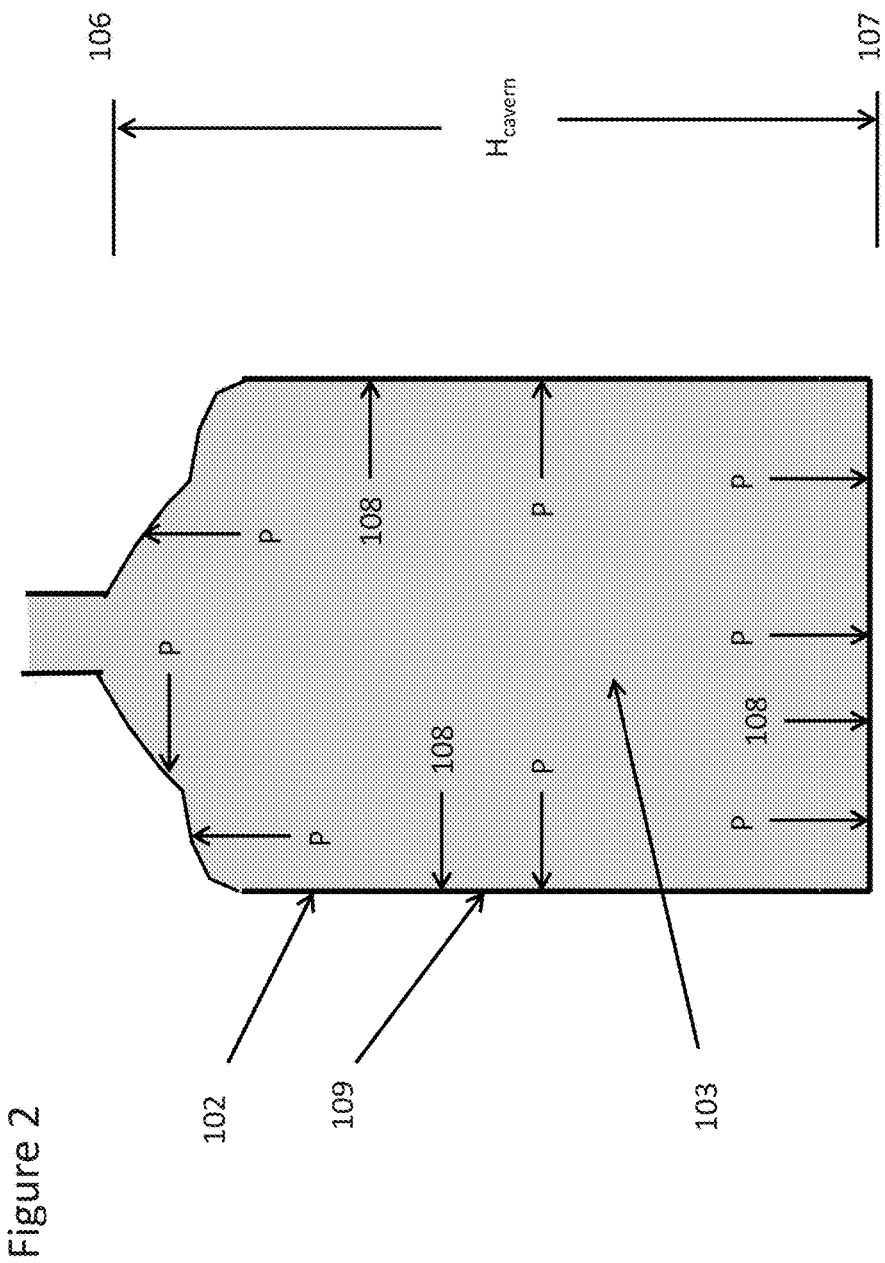
FIG. 2 is a schematic representation of a salt cavern illustrating the domed roof, the height within the salt cavern, and the internal gas pressures, in accordance with one embodiment of the present invention.
Figure 3:
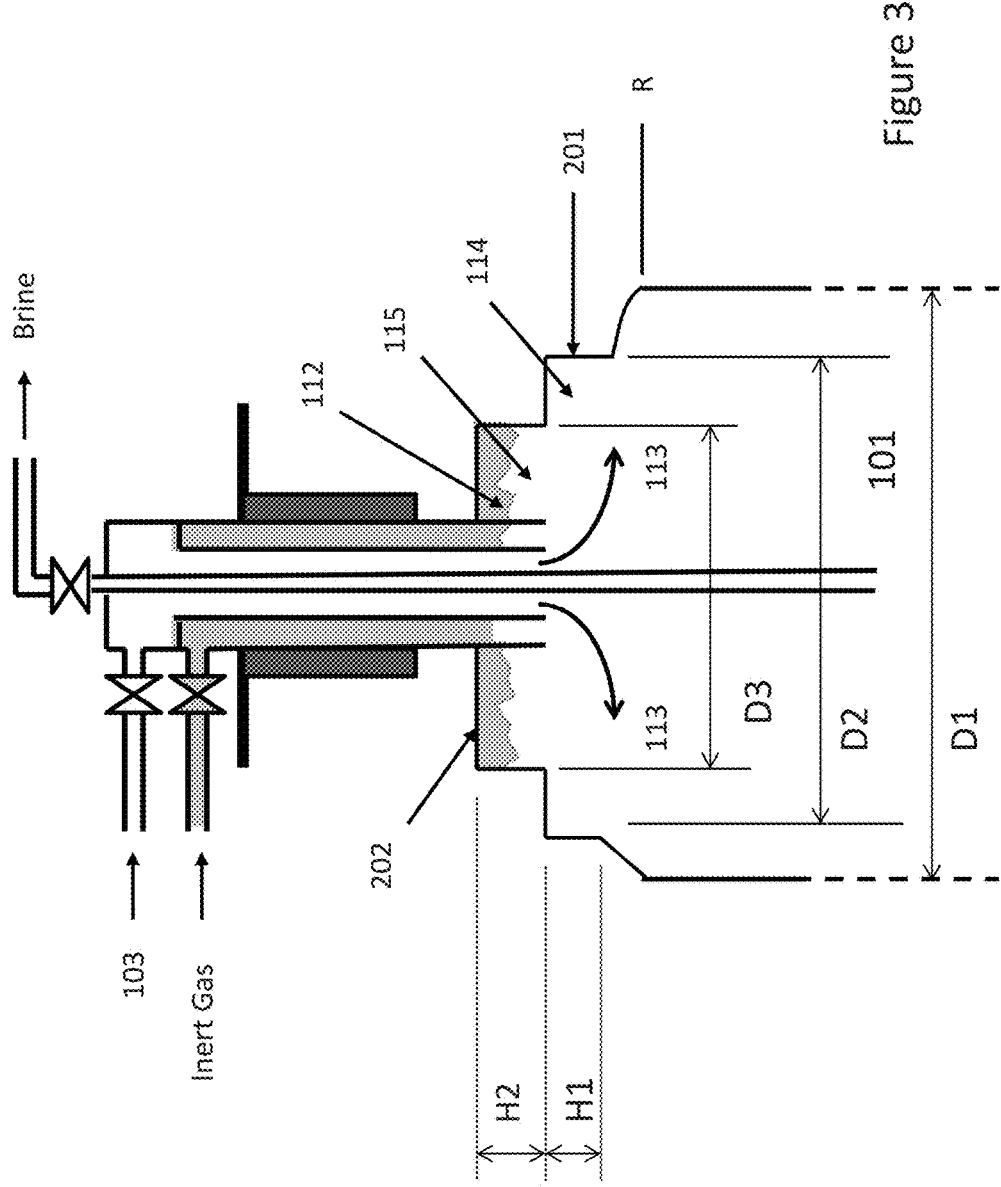
FIG. 3 is a schematic representation of a salt cavern illustrating the solution mining of the domed roof under an inert gas, in accordance with one embodiment of the present invention.
Figure 4:
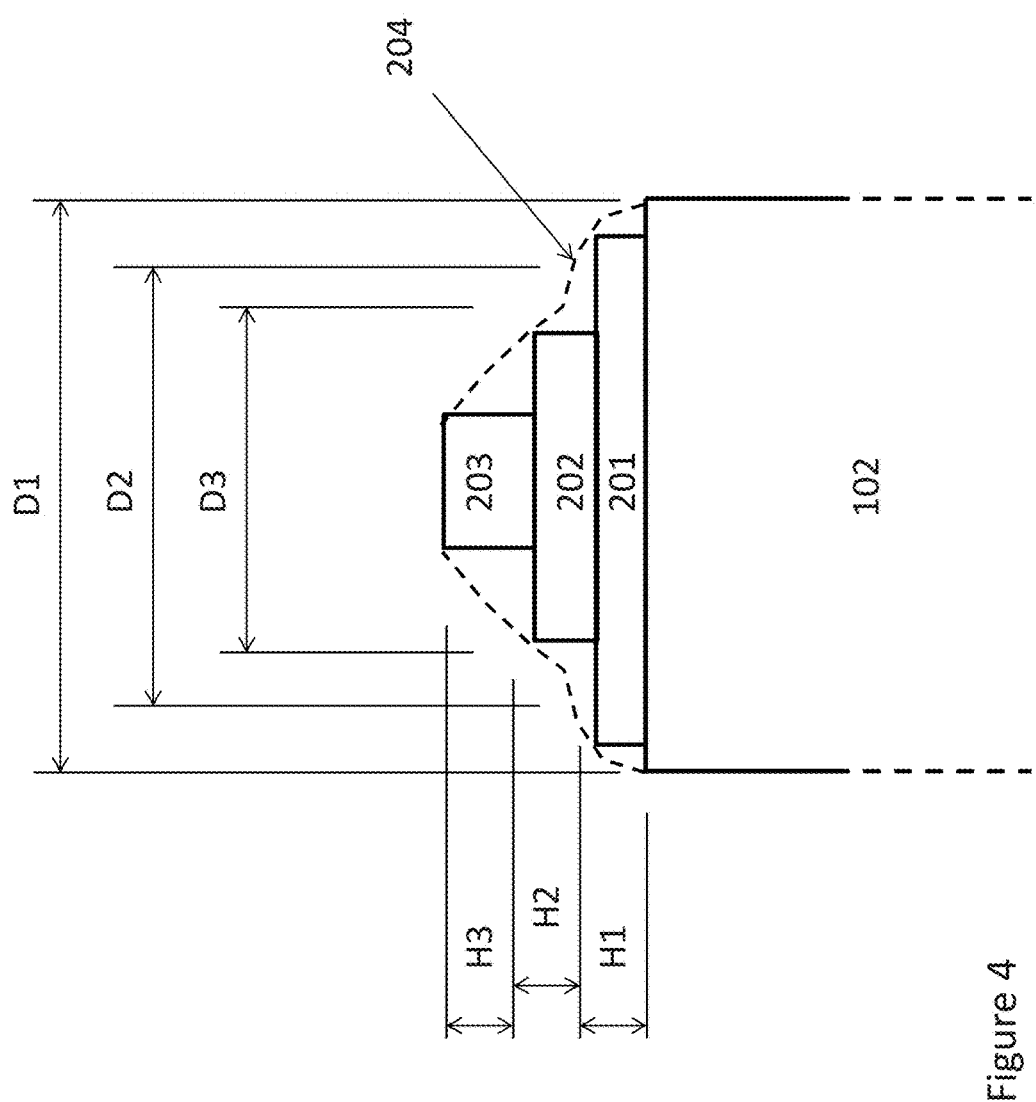
FIG. 4 is a schematic representation of a salt cavern illustrating the solution mining of the domed roof under an inert gas, in accordance with one embodiment of the present invention.
Figure 5:
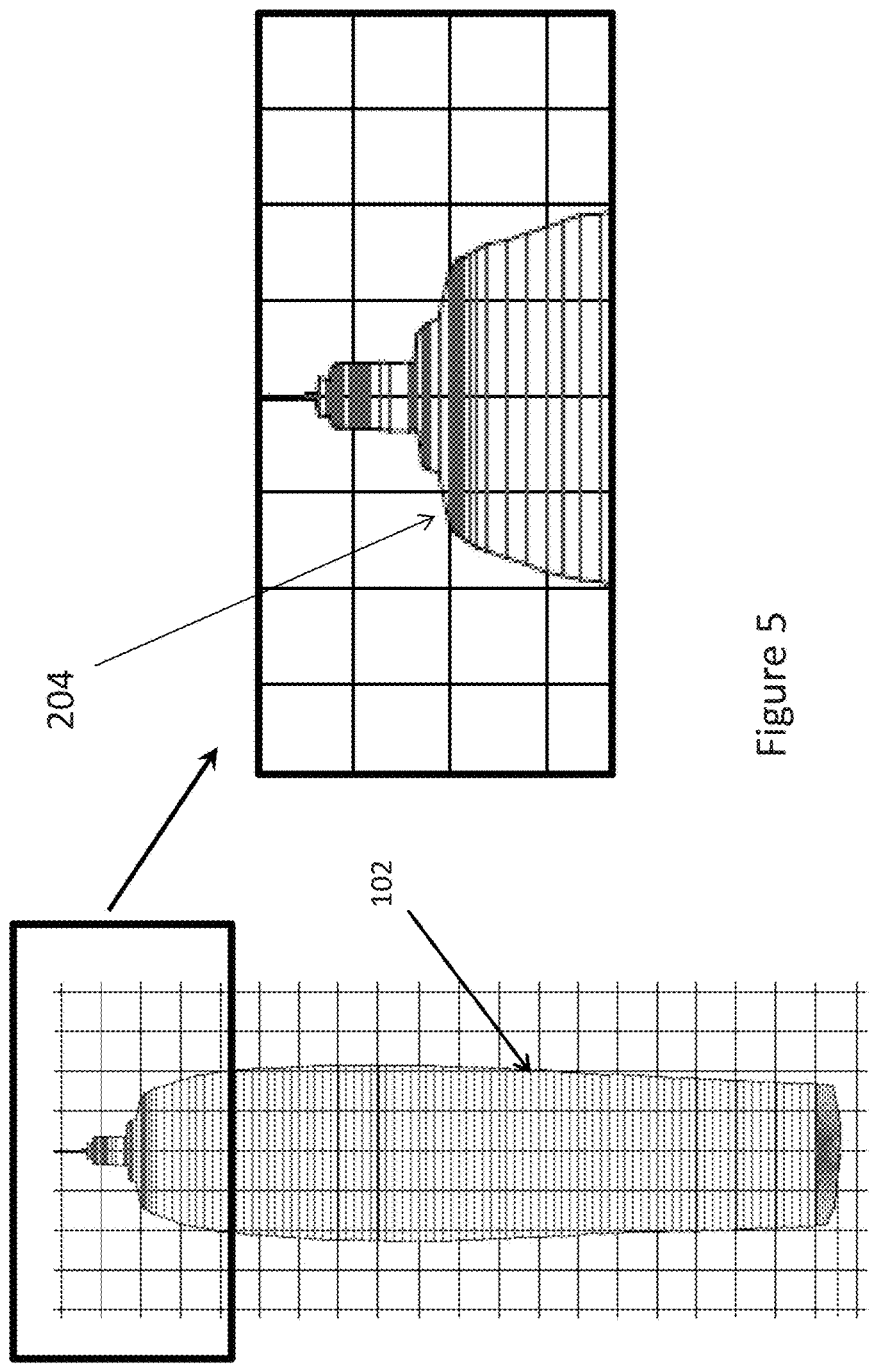
FIG. 5 is a representative sonogram of a cavern solution mined with a domed roof, under an inert gas, in accordance with one embodiment of the present invention.

Turning to FIG. 2, the pressure of the stored very high purity hydrogen 103 exerts a pressure, denoted as "P", against the interior walls 108 of the salt cavern 102. The pressure exerted by the stored hydrogen 103 against the salt cavern walls 108 is maintained above a lower threshold limit and below an upper threshold limit such a fundamentally impervious boundary 109 is formed and/or maintained along the interior wall 108.

Stable Roof Shape

One of the most important structural features of an underground salt cavern is the final design of the roof. For example, it has been found that high pressure, or rapid pressure movements, can cause failure of the salt cavern roof.

The overall stability of the roof of a leached salt cavern may be improved by creating a domed roof (or semi-domed roof) using in an inert gas blanket during leach mining. The inert gas depth may be raised in increments of between 20 to 40 ft at a time. The cavern roof may be leached to a diameter 20 to 30 percent less than the old essentially flat roof. Once the new roof is leached to the smaller diameter, the inert gas blanket is raised another 20 to 40 ft and the cavern roof is leached to a diameter 20 to 30 percent less than the old roof. This process continues until the final geometry of the cavern approximates a dome. Geometry of the roof may be verified by through pipe sonar.

The geometry of the storage cavern roof may also be controlled by the flow of water into the cavern. The water injection flow into the cavern may be maintained between the minimum flow rate of 5 ft/sec velocity and the maximum flow rate of 8 ft/sec. Ideal cavern roof geometry is achieved by flowing at a constant flow rate of approximately between 6 and 7 ft/sec.

It is theorized that a salt dome with such a domed roof provides structural stability at pressures greater than 1.0 psi per linear foot of height within the cavern, and less than 4.0 psi per linear foot of height within the cavern. The structural stability improves over the prior art by resisting new fracture formation and also providing the salt in the roof the ability to heal fractures more effectively which thereby contributes to the formation and maintenance of a fundamentally impervious boundary to very high purity hydrogen in the domed/semi-domed roof. Thus a domed roof (or semi-domed roof) is one contributing factor capable of enabling storage of very high purity hydrogen above the prior art pressure limit of 1.0 psi per linear foot of height within the cavern.

As indicated in FIGS. 2, 3, 4 and 5, a solution mined underground salt cavern 102 has a main body with a mean diameter of D1, and an upper portion comprising an inert gas pad 112. The inert gas may be selected from nitrogen, helium, argon, and/or methane. A stream of leaching water 113 is injected below inert gas pad 112 with a velocity V. Velocity V may be between 5 feet/second and 9 feet per second, preferably V may be between 6 feet/second and 7 feet/second.

The inert gas pad 112 has a pressure, and a depth defined by the interface between the inert gas and a brine/water mixture produced by the solution mining, and the inert gas pad depth may be determined by monitoring the gas pad pressure. The inert gas pad height is raised H1 feet. H1 may be between 20 feet and 40 feet, preferably between 25 feet and 35 feet, more preferably 30 feet. As leaching water 113 is injected, it now reaches region 114, which had previously been protected from leaching by inert gas pad 112, thereby solution mining this portion of the roof of cavern 102.

The leaching water 113 produces a first tier 201 in the top of cavern 102. First tier 201 has a height H1 above the nominal roof of the cavern R, and a mean diameter D2 that is smaller than D1 by a predetermined ratio $R_1$. The ratio $R_1$ may be between 15% and 35%, preferably $R_1$ may be between 20% and 30%, even more preferably $R_1$ may be 25%. The inert gas pad height is raised H2 feet. H2 may be between 10 feet and 50 feet, preferably between 20 feet and 40 feet, preferably between 25 feet and 35 feet, more preferably 30 feet. As leaching water 113 is injected, it now reaches region 115, which had previously been protected from leaching by inert gas pad 112, thereby solution mining this portion of the roof of cavern 102.

The leaching water 113 produces a second tier 202 in the top of cavern 102. First tier 202 has a height H2 above first tier 201, and a mean diameter D3 that is smaller than D2 by a predetermined ratio $R_2$. The ratio $R_2$ may be between 15% and 35%, preferably $R_2$ may be between 20% and 30%, even more preferably $R_2$ may be 25%. These steps are repeated, thereby forming a stable, dome shaped roof 204. A sonar image of a cavern that was solution mined as discussed above and displaying the resulting domed roof is presented in FIG. 5, and discussed in the Example below.

Stable Cavern Shape

Another structural feature of an underground salt cavern of significance is the final shape of the cavern itself. There is some disagreement in the literature about which shape is optimum for the storage of a gas, with the actual cavern shape often being a function of the volume and shape of good salt in the region to be mined, and luck. In some instances, it is believed that a more spherical overall shape is better suited for high pressure gas storage (see CN102720538). In other instances, a more cylindrical shape is believed to be more desirable (see U.S. Pat. No. 9,322, 253).

Studies have determined that a cavern with a lower aspect ratio is more affected by creep closure and the effective stress in the cavern walls. See *Feasibility Study of Underground Salt Caverns in Western Newfoundland: Experimental and Finite Element Investigation of Creep-Induced Damage*; Ghasemloonia and Butt, Journal of Mining and Environment, 2015.

However, in unexpected contrast to these findings, the inventors theorize that a cavern with an aspect ratio of between 3:1 and 7:1, preferably between 3.25:1 and 6.75:1, more preferably between 3.5:1 and 6.5:1, more preferably between 3.75:1 and 6.25:1, and still more preferably between 4:1 and 6:1, is one contributing factor for providing an improved ability to resist formation of and/or heal fractures and thereby contribute to the formation of a fundamentally impervious boundary able to substantially contain very high purity hydrogen at pressures greater than 1.0 psi per linear foot of height within the cavern, and less than 4.0 psi per linear foot of height within the cavern.

Soft Salt Versus Hard Salt

In geological terms, a "soft salt" is defined as one being less creep resistant, and a "hard salt" is defined as one being more creep resistant. While values vary within the literature, generally speaking "soft salt" may be considered to have a Creep Constant of greater than about $1.0 \times 10^{-28}$ $1/(psf^n \cdot sec)$ and "hard salt" is considered to have a Creep Constant of less than about $1.0 \times 10^{-28}$ $1/(psf^n \cdot sec)$. This Creep Constant is examined in more detail in the Example below. One potential contributing factor for the present invention is the presence of hard, or preferably very hard, salt in the majority of the perimeter of the salt dome.

The inventors theorize that a cavern with salt having a Creep Constant of less than $1.5 \times 10^{-29}$ $1/(psf^n \cdot sec)$, preferably less than $1.0 \times 10^{-29}$ $1/(psf^n \cdot sec)$, more preferably less than $7.5 \times 10^{-39}$ $1/(psf^n \cdot sec)$, more preferably less than $5.0 \times 10^{-39}$ $1/(psf^n \cdot sec)$, and still more preferably less than $1.5 \times 10^{-30}$ $1/(psf^n \cdot sec)$, is one contributing factor for providing an improved ability of a salt cavern wall to resist formation of and/or heal fractures and thereby improve the ability of that wall to produce and/or maintain a fundamentally impervious boundary able to substantially contain very high purity hydrogen at pressures greater than 1.0 psi per linear foot of height within the cavern, and less than 4.0 psi per linear foot of height within the cavern.

Tensile Strength

The tensile strength is a measure of the salts capacity to withstand stretching or elongating loads. Tensile strength is a parameter used to determine dilation criterion. The tensile strength of salt (halite) typically found in salt formations is usually 200 psi or slightly greater. It has been shown in the literature that some impurities (such as CaCl2) or SrCl2, or PbCl2, can increase the tensile strength of salt by as much as 300%. See *Physical Properties of Salt, Anhydrite, and Gypsum—Preliminary Report*; Robertson, Robie, and Brooks, United States Department of the Interior, 1958.

The inventors theorize that a cavern with salt having tensile strength of less than 200 psi, preferably less than 190 psi, more preferably less than 180 psi, more preferably less than 175 psi, and more preferably less than 170 psi, is one potential contributing factor for an improved ability of a salt cavern wall to heal fractures and thereby improve the ability of that wall to produce and/or maintain a fundamentally impervious boundary able to substantially contain very high purity hydrogen at pressures greater than 1.0 psi per linear foot of height within the cavern, and less than 4.0 psi per linear foot of height within the cavern. The analysis results of salt core samples displaying the resulting tensile strengths is presented in FIG. 5, and discussed in the Example below.

Compressive Strength

Figure 7:
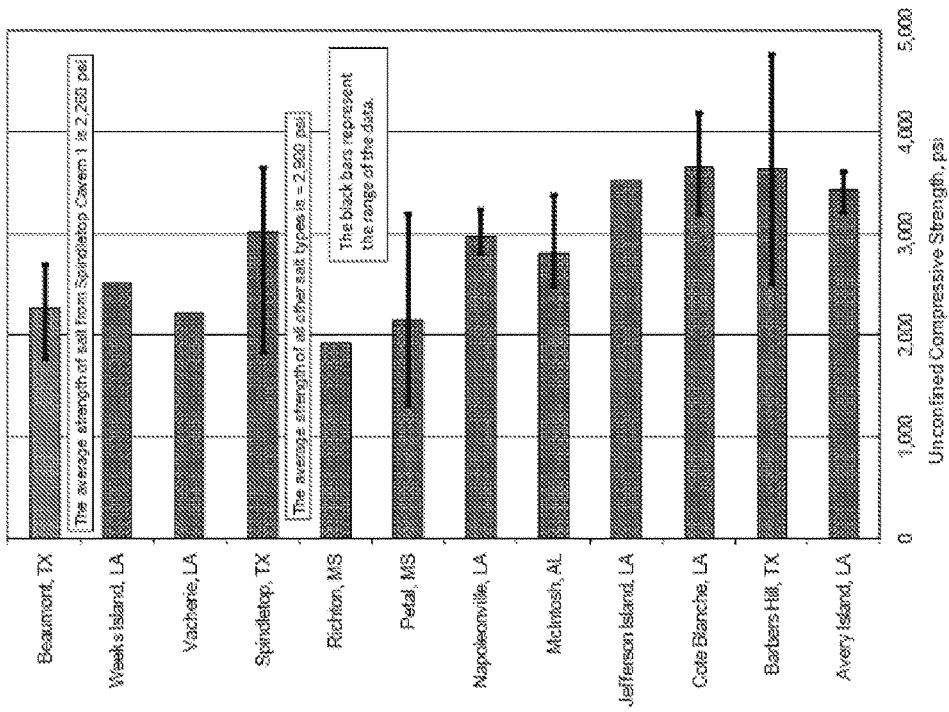
FIG. 7 is a comparison of unconfined compressive strengths of salt from various salt caverns, in accordance with one embodiment of the present invention.

The compressive strength is a measure of the salts capacity to withstand compressing loads. The inventors theorize that a cavern with salt having compressive strength of less than 2700 psi, preferably less than 2600 psi, preferably less than 2500 psi, more preferably less than 2400 psi, and more preferably less than 2300 psi, is one contributing factor for providing an improved ability of a salt cavern wall to heal fractures and thereby improve the ability of that wall to produce and/or maintain a fundamentally impervious boundary able to substantially contain very high purity hydrogen at pressures greater than 1.0 psi per linear foot of height within the cavern, and less than 4.0 psi per linear foot of height within the cavern. The analysis results of salt core samples displaying the resulting compressive strengths is presented in FIG. 7, and discussed in the Example below.

Young's Modulus

Young's Modulus is the slope of the stress-strain curve in elastic formation. It is the measure of a material's resistance to being deformed elastically when a force is applied. A stiffer material has a higher Young's Modulus. The Young's Modulus for pure halite (with a confining stress of 2175 psi) is approximately 3,650,000 psi.

Figure 8:
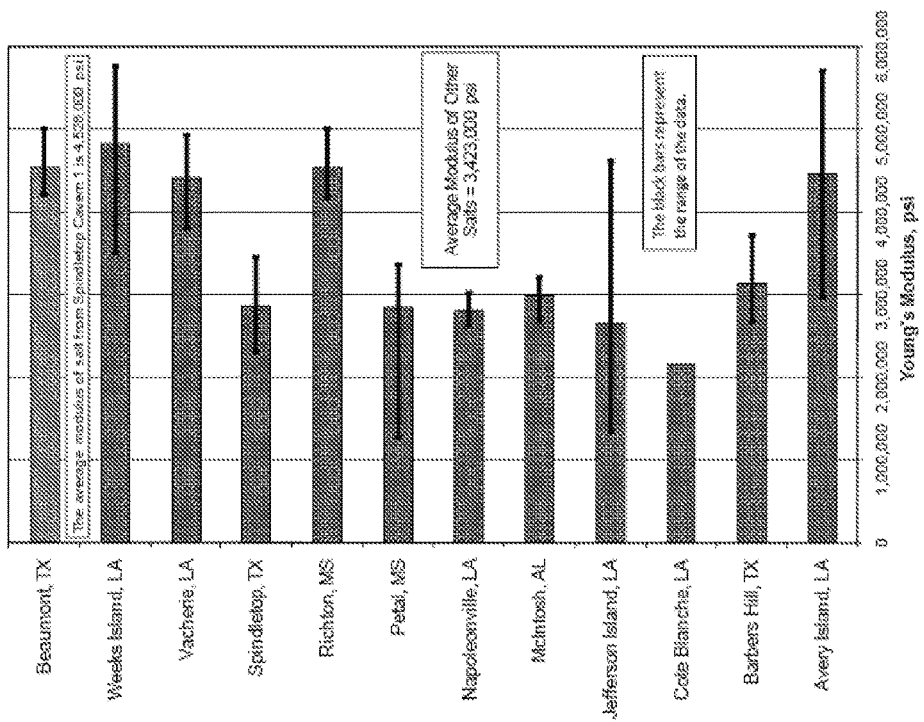
FIG. 8 is a comparison of Young's Modulus from salt from various salt caverns, in accordance with one embodiment of the present invention.

It is theorized that a region of salt which has an average Young's Modulus of more than 4,000,000 psi, preferably more than 4,200,000 psi, more preferably more than 4,300,000 psi, more preferably more than 4,400,000 psi, and more preferably more than 4,500,000 psi, provides the ability of a salt cavern wall to resist formation of and/or heal fractures and thereby improve the ability of that wall to produce and/or maintain a fundamentally impervious boundary able to substantially contain very high purity hydrogen at pressures greater than 1.0 psi per linear foot of height within the cavern, and less than 4.0 psi per linear foot of height within the cavern. The analysis results of salt core samples displaying the resulting Young's Modulus is presented in FIG. 8, and discussed in the Example below.

Each of the foregoing contributing factors may be optimized alone or in combination with one or more of the other factors to enable a salt cavern to be used to store very high purity hydrogen at pressures greater than the current state of the art limit of 1.0 psi per linear foot of height within the cavern; such as the 3.14 psi/ft demonstrated in the Example below and theoretically up to 4.0 psi/ft or even greater depending on the number of, and individual impact of, the contributing factor(s), for a specific salt cavern.

To be clear, while implementing the invention herein is expected to improve the maximum storage pressure for any salt cavern, the magnitude of such improvement will vary from cavern to cavern. The state of the art provides techniques for evaluating the new upper pressure limits for a particular salt cavern. See, for example, Durup, J. G., 1994. Long Term Tests for Tightness Evaluations With Brine and Gas in Salt (Field Test No. 2 With Gas), Solution Mining Research Institute, Report No. 94-0002-S, Woodstock, Ill. More generally, the new upper pressure limit (i.e. how much greater than 1.0 psi per linear foot of height within the cavern) will be apparent from the pressure at which pressure losses occur and/or hydrogen gas leakage is detected at the surface above the salt cavern. Because salt is viscoelastic, the fractures responsible will heal upon lowering the pressure. The pressure of the very high purity hydrogen may thus be reduced and operationally set to a suitable safety margin below the newly ascertained upper limit, preferably in the range of 70-95% of the new upper pressure limit.

Specific embodiments that include one or more salt mechanical criteria may involve a site selection process wherein salt samples are collected and evaluated to identify sites based on these criterion/criteria as being suitable for solution mining a new salt cavern for the purpose of storing very high purity hydrogen at pressures greater than the current state of the art limit of 1.0 psi per linear foot of height within the cavern.

EXAMPLE

In general, drilling, collection, storage, transporting and processing of rock salt samples for testing may be performed by well established procedures known in the art, specifically including the following ASTM standards, which are hereby incorporated by reference:

D653-14 Terminology Relating to Soil, Rock, and Contained Fluids

D2113-14 Practice for Rock Core Drilling and Sampling of Rock for Site Investigation D5079-08 Practices for Preserving and Transporting Rock Core Samples D4543-08 Standard Practices for Preparing Rock Core as Cylindrical Test Specimens and Verifying Conformance to Dimensional and Shape Tolerances Referring to FIG. 1, a gaseous very high purity hydrogen stream was withdrawn from a hydrogen pipeline (not shown), compressed and then injected (not shown) via conduit 101 into the cavern 102 as a compressed stored very high purity hydrogen 103. The upper most portion of the cavern 106 is approximately 3960 feet below grade 105. The lower most portion of the cavern 107 is approximately 4900 feet below grade. Therefore, the height of the salt cavern $H_{cavern}$ is approximately 940 feet.

This cavern operates at a minimum pressure of approximately 1015 psia and a maximum pressure of approximately 2960 psia. Therefore, at the minimum pressure the ratio of pressure to cavern height is approximately 1.08. At the maximum pressure the ratio of pressure to cavern height is approximately 3.14.

Pressure measurements ranging from 2.13 psi/$H_{cavern}$ (2000 psig) to 3.14 psi/$H_{cavern}$ (2960 psig), including periods of hydrogen addition and/or removal, as well as periods of dormancy, have been compiled for 18 months. Once the 3.14 psi/$H_{cavern}$ (2960 psig) pressure was attained, a three day stabilization phase was allowed for the pressure and temperature within the cavern to normalize. After this stabilization phase, a test was performed for three days to detect any leakage. The cavern was then held at 3.14 psi/$H_{cavern}$ (2960 psig) for 24 additional days for observation. After the pressure test and observation and 3.14 psi/$H_{cavern}$ (2960 psig) was completed, additional brine was withdrawn to completely dewater the cavern and the cavern pressure has been shut in at 2.89 psi/$H_{cavern}$ (2720 psig) for 60 days.

To date, there has been no pressure loss or above ground hydrogen detection to indicate any loss of hydrogen. The results indicated that the volume of stored hydrogen 103 at the start of any observation period was equal to the total volume of stored hydrogen 103 at the end of that observation period. These results support the conclusion that the fundamentally impervious boundary was formed and maintained during the observation window to substantially contain the very high purity hydrogen stored in the cavern.

1). For this cavern, the set of salt core samples was evaluated at three different imposed stress differentials. Triaxial Compression Creep testing in accordance with ASTM procedure D7070-08.

This creep test is initiated by applying confining pressure to all exterior surfaces of a specimen that has been jacketed in a flexible membrane to protect it from the pressurizing medium and then h eating the jacketed specimen to the prescribed test temperature. Once the confining pressure and temperature are stable, axial stress is quickly applied until the target stress difference is reached; at which time the confining pressure and stress difference are maintained at their specified levels for the duration of the test.

During the test, axial force, confining pressure, axial displacement, radial displacement, and temperature are recorded. Axial stress is calculated from the axial force and the current cross sectional area of the specimen. Axial and radial true (logarithmic) strains are calculated from the axial and radial displacements and the specimen dimensions.

Figure 9:
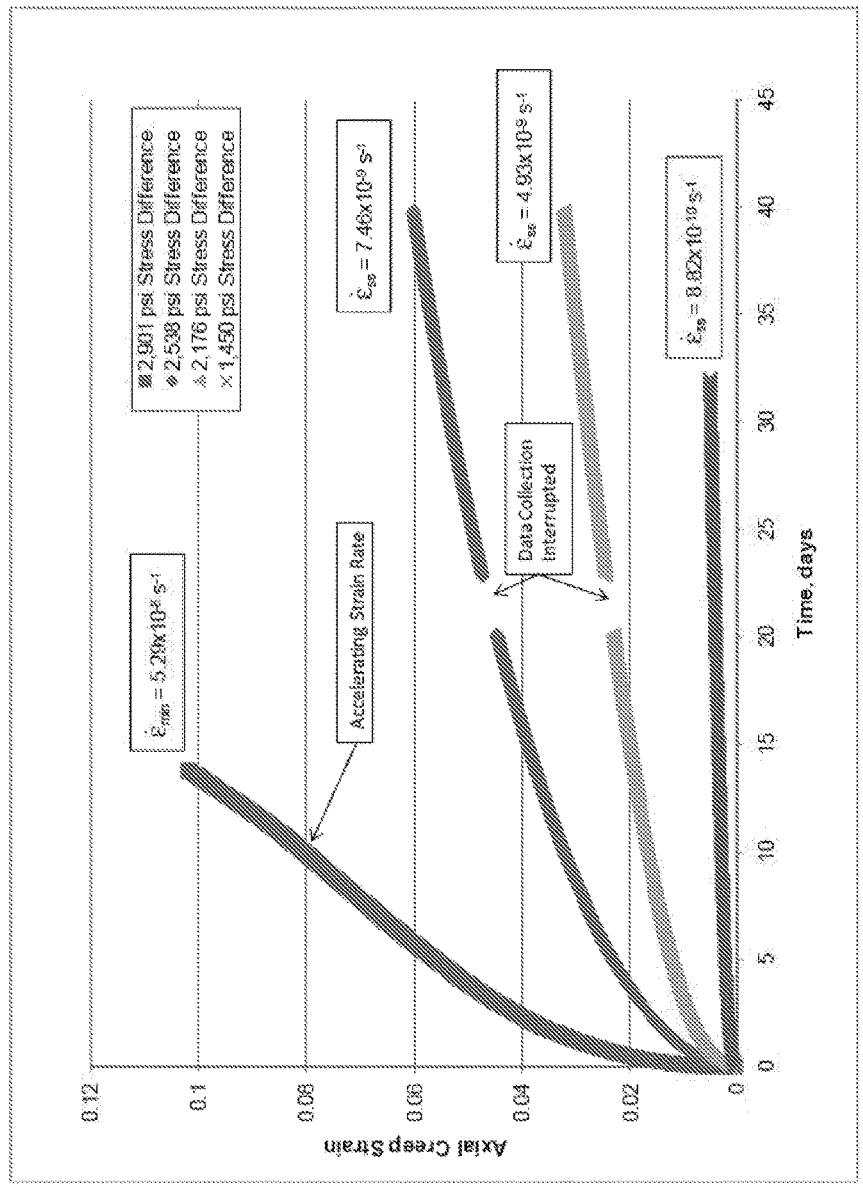
FIG. 9 is a comparison of axial creep strain versus time for salt, in accordance with one embodiment of the present invention.
Figure 10:
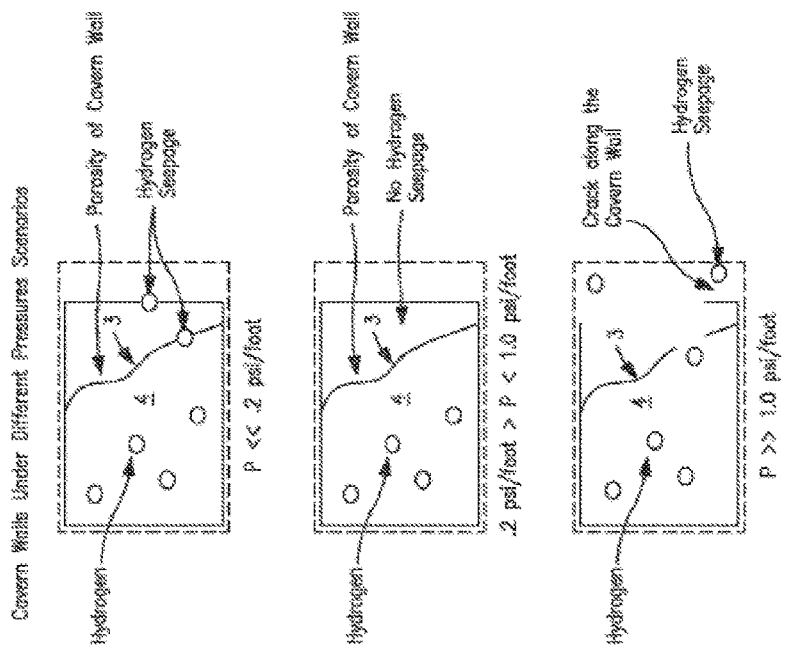
FIG. 10 is a prior art reproduction of FIGS. 4A, 4B, and 4C from U.S. Pat. No. 8,690,376 illustrating the formation of a permeation barrier that serves as a substantially impermeable barrier to very high purity hydrogen.
Figure 11:
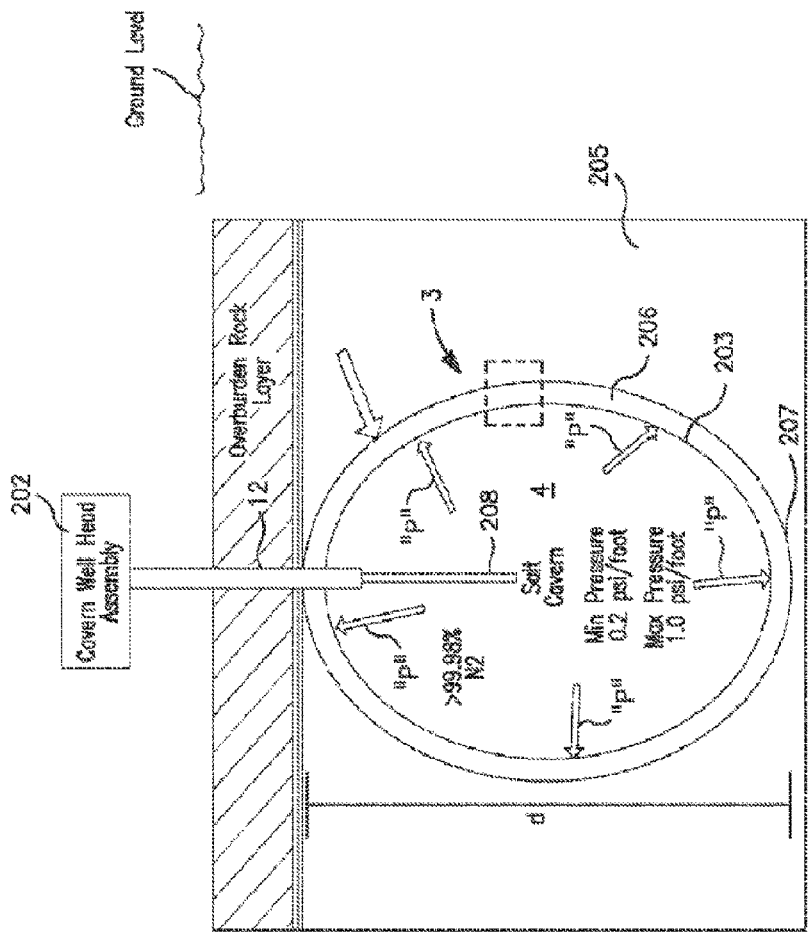
FIG. 11 is a prior art reproduction of FIG. 2 from U.S. Pat. No. 8,690,376 illustrating the permeation barrier that serves as a substantially impermeable barrier to very high purity hydrogen and illustrating the cavern depth "d" from the roof to the floor of the cavern (herein referred to as "$H_{cavern}$").

The following values were determined (see FIG. 9):

1) 1450 PSI Stress Difference:
$\dot{\varepsilon}_s$=the steady-state creep strain rate=$8.82 \times 10^{-10}$ s$^{-1}$
A=the creep constant
n=the stress exponent=3.9
$\Delta\sigma$=the imposed stress difference=1450 psi $$\log \dot{\varepsilon}_s = \log A + n \log(\Delta\sigma)$$

$$\log(8.82 \times 10^{-10}) = \log A + (3.9)[\log(1450)]$$

$$-9.0545 = \log A + (3.9)(3.1614)$$

$$-21.3839 = \log A$$

$$A = 1.5796 \times 10^{-30} \ 1/(\text{psf}^{3.9} \cdot \text{sec}) < 1.0 \times 10^{-28} \ 1/(\text{psf}^n \cdot \text{sec}) = \text{"hard salt"}$$

2) 2176 PSI Stress Difference:
$\dot{\varepsilon}_s$=the steady-state creep strain rate=$4.93 \times 10^{-9}$ s$^{-1}$
A=the creep constant
n=the stress exponent=3.9
$\Delta\sigma$=the imposed stress difference=2176 psi $$\log \dot{\varepsilon}_s = \log A + n \log(\Delta\sigma)$$

$$\log(4.93 \times 10^{-9}) = \log A + (3.9)[\log(2176)]$$

$$-8.3072 = \log A + (3.9)(3.3377)$$

$$-21.3240 = \log A$$

$$A = 1.8128 \times 10^{-30} \ 1/(\text{psf}^{3.9} \cdot \text{sec}) < 1.0 \times 10^{-28} \ 1/(\text{psf}^n \cdot \text{sec}) = \text{"hard salt"}$$

3) 2538 PSI Stress Difference:
$\dot{\varepsilon}_s$=the steady-state creep strain rate=$7.46 \times 10^{-9}$ s$^{-1}$
A=the creep constant
n=the stress exponent=3.9
$\Delta\sigma$=the imposed stress difference=2538 psi $$\log \dot{\varepsilon}_s = \log A + n \log(\Delta\sigma)$$

$$\log(7.46 \times 10^{-9}) = \log A + (3.9)[\log(2538)]$$

$$-8.1273 = \log A + (3.9)(3.4045)$$

$$-21.4048 = \log A$$

$$A = 1.5054 \times 10^{-30} \ 1/(\text{psf}^{3.9} \cdot \text{sec}) < 1.0 \times 10^{-28} \ 1/(\text{psf}^n \cdot \text{sec}) = \text{"hard salt"}$$

2). For this cavern, the set of salt core samples was subjected to a Brazilian Indirect Tensile Strength test in accordance with ASTM D3967-08.

Figure 6:
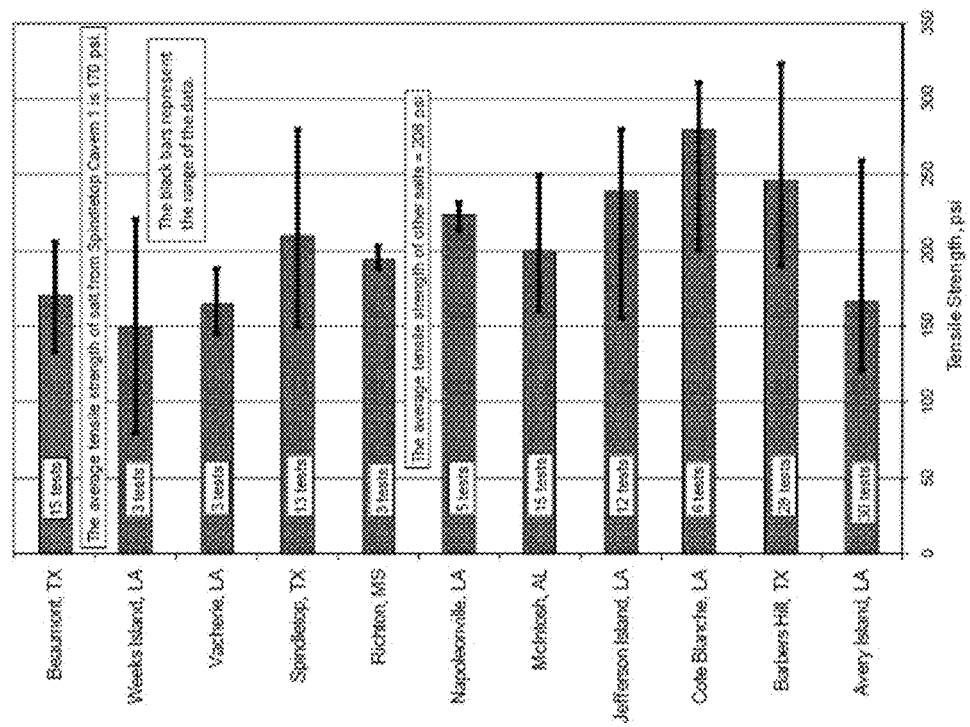
FIG. 6 is a comparison of tensile strengths of salt from various salt caverns, in accordance with one embodiment of the present invention.

This method is termed an indirect method because a compressive, diametral line load is applied over the length of a cylindrical specimen having an L:D=0.5:1. The compressive load induces a tensile stress at the center of the specimen perpendicular to the diametral line load. As the compressive line load increases, so does the tensile stress. The tensile strength is computed according to:

$$T_0 = 2P/\pi DL$$

where:
T0=apparent tensile strength, psi
P=line load at failure, lb
D=specimen diameter, in
L=specimen length, in Fifteen samples were tested on salt recovered from near 3,500 feet and near 4,300 feet. The average tensile strength that resulted from the 3,500 foot samples was 161 psi. The average tensile strength that resulted from the 4,300 foot samples was 178 psi. The mean value for all samples tested was 170 psi. See FIG. 6.

3). For this cavern, the set of salt core samples was subjected to a Constant Strain Rate test in accordance with ASTM D7012-10.

RESPEC Consulting & Services (RSI) performed this at a temperature of 68 F, and an axial strain rate of $10^{-4}$ $s^{-1}$. Seven samples were tested without a confining pressure to determine the unconfined compressive strength. The average compressive strength that resulted was 2260 psi. See FIG. 7.

4). For this cavern, the set of salt core samples was subjected to a Constant Mean Stress test in accordance with ASTM D7012-10.

RESPEC Consulting & Services (RSI) performed this at a temperature of 68 F, and an axial strain rate of $10^{-4}$ $s^{-1}$. Eighteen samples were tested. For these eighteen tests, the confining pressure was held constant tat 1000 psi to prevent any dilation from occurring during these tests. When the axial stress difference reached 950 psi, an unload/reload cycle was performed. The data obtained during this unload/reload cycle was used to calculate Young's modulus. The average Young's Modulus that resulted was 4,526,000 psi. See FIG. 8.

What is claimed is:

1. A method for forming and maintaining a fundamentally impervious boundary to very high purity hydrogen stored in a salt cavern, comprising a salt cavern wall, the salt cavern comprising one or more of the following attributes:

salt having a mean creep constant along substantially the entire cavern wall of less than $1.5 \times 10\text{-}301/(psfn*sec)$, salt having a mean tensile strength along substantially the entire cavern wall of less than 200 psi, salt having a mean compressive strength along substantially the entire cavern wall of less than 2700 psi, salt with a mean Young's Modulus along substantially the entire cavern wall of more than 4,000,000 psi, the method comprising:

introducing a compressed very high purity hydrogen gas into a salt cavern, thereby producing a stored very high purity hydrogen gas;

forming a fundamentally impervious boundary to the very high purity hydrogen along at least a part of the perimeter of the salt cavern, and maintaining the fundamentally impervious boundary to the stored very high purity hydrogen gas at a pressure greater than 1.1 psi per linear foot of height within the cavern, and less than 4.0 psi per linear foot of height within the cavern and thereby retaining within the salt cavern over 95% of the stored very high purity hydrogen over a period of time of at least 72 hours.

* * * * *